(12) United States Patent
Gehrig et al.

(10) Patent No.: US 9,448,381 B2
(45) Date of Patent: Sep. 20, 2016

(54) DUAL LENS-HOLDING DEVICE

(75) Inventors: Jean Gehrig, Viry (FR); Denis Gehrig, Saint-Julien en Genevois (FR)

(73) Assignee: SCL INTERNATIONAL SPECIAL COATING LABORATORY, Archamps (FR)

( * ) Notice: Subject to any disclaimer, the term of this patent is extended or adjusted under 35 U.S.C. 154(b) by 220 days.

(21) Appl. No.: 13/989,145

(22) PCT Filed: Nov. 22, 2011

(86) PCT No.: PCT/FR2011/052725
§ 371 (c)(1),
(2), (4) Date: May 23, 2013

(87) PCT Pub. No.: WO2012/069756
PCT Pub. Date: May 31, 2012

(65) Prior Publication Data
US 2013/0235482 A1 Sep. 12, 2013

(30) Foreign Application Priority Data
Nov. 25, 2010 (FR) ...................................... 10 59716

(51) Int. Cl.
*G02B 7/02* (2006.01)
*B05C 13/02* (2006.01)
*B29D 11/00* (2006.01)
*B05C 3/09* (2006.01)
*G02B 25/00* (2006.01)

(52) U.S. Cl.
CPC ................. *G02B 7/02* (2013.01); *B05C 13/02* (2013.01); *B29D 11/00432* (2013.01); *B05C 3/09* (2013.01); *G02B 25/008* (2013.01)

(58) Field of Classification Search
CPC ........... G02B 7/02; B05C 13/02; B05C 3/09; B29D 11/00432
USPC .................................. 359/694–704, 811–830
See application file for complete search history.

(56) References Cited

U.S. PATENT DOCUMENTS

2005/0207033 A1* 9/2005 Fournand et al. ............. 359/819
2010/0275839 A1* 11/2010 Velasquez et al. ........... 118/503

FOREIGN PATENT DOCUMENTS

| EP | 1428585 A1 | 6/2004 |
| GB | 2208322 A | 3/1989 |
| JP | 2010-020138 A | 1/2010 |
| WO | 2005089956 A1 | 9/2005 |

OTHER PUBLICATIONS

International Search Report issued Mar. 20, 2012 re: PCT/FR2011/052725; citing: GB 2 208 322 A, JP 2010-020138 A, WO 2005/089956 A1 and EP 1 428 585 A1.

* cited by examiner

*Primary Examiner* — Scott J Sugarman
*Assistant Examiner* — Alberto Betancourt
(74) *Attorney, Agent, or Firm* — Cantor Colburn LLP

(57) ABSTRACT

The invention relates to a lens-holding device (1) intended to be hooked on a mounting (101) of a conveyor carriage for transporting optical lenses (10) in order for said lenses to be treated by immersion in at least one bath of a treatment machine. The lens-holding device (1) is hooked on in such a way as to form an alignment of devices together with a group of other similar devices in a predetermined direction. The lens-holding device (1) comprises: means (3) for hanging same from the mounting (101); first means (4a) for holding a first optical lens (10) in position on the lens-holding device (1), which include supporting points (a, b, c) defining a first space for the first lens (10); and second means (4b) for holding a second optical lens (10) in position on the lens-holding device (1), which include supporting points (a, b, c) defining a second space for the second lens (10), the two spaces being arranged respectively in two planes separated by an angular distance of less than 30° and forming an angle of less than 30° relative to the direction defined by the alignment of the group of lens-holding devices (1).

10 Claims, 4 Drawing Sheets

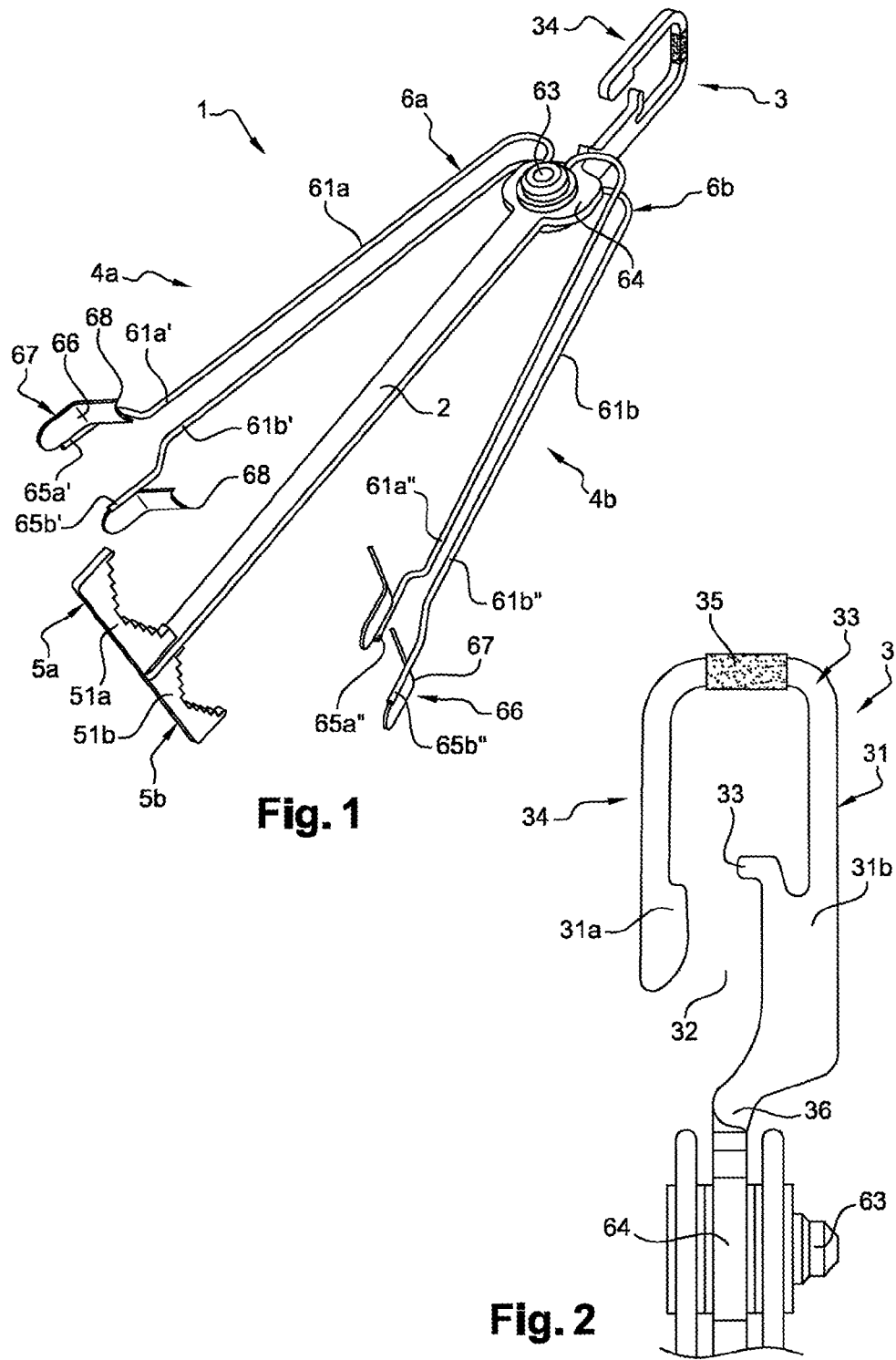

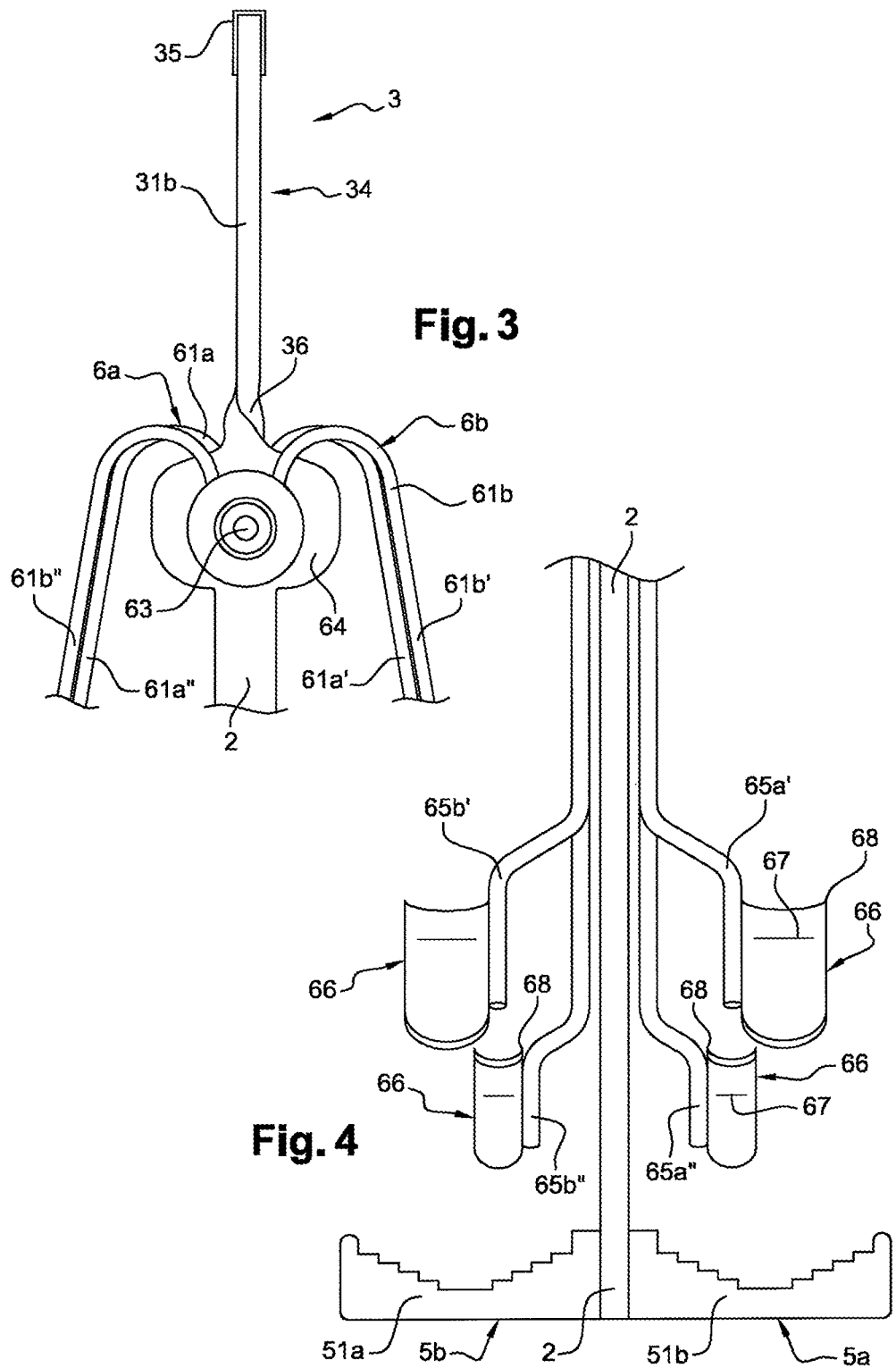

DUAL LENS-HOLDING DEVICE

TECHNICAL FIELD

The present invention relates to a lens-holding device more particularly designed for the analysis of optical lenses.

BACKGROUND

A lens-holding device may typically be hooked to a support of a conveyor carriage of an optical lens treatment machine, said conveyor carriage being designed to transport optical lenses so as to treat them through immersion in several successive baths of the treatment machine.

These treatments may be of various types, such as chemical strengthening, thermal strengthening, or treatments providing abrasion resistance, anti-scratch treatments, antireflective treatments, anti-soiling treatments, ultraviolet treatments, or tinting treatments.

It is known from document EP1428585B1 to have a lens-holding device including a support, said lens-holding device being hooked so as to form, with a set of other similar devices, an alignment of devices in a determined direction, said lens-holding device including suspension means for hanging from the support, and means for holding the optical lens in position.

Furthermore, the holding means comprise means for supporting the optical lens, said support means including at least one fixed stop.

The holding means also comprise elastic return means making it possible to place and remove the optical lens on the lens-holding device, said elastic return means including pairs of elastic arms mounted around a rivet secured to a body of the lens-holding device.

This lens-holding device is satisfactory in that it ensures good holding of the optical lens without covering any portion whatsoever of its two main faces or optics.

Nevertheless, the set of optical lenses transported by the conveyor carriage is designed to be immersed in a series of treatment baths.

Each of these baths is contained in a dedicated vessel and the bulk of said vessels should be reduced as much as possible so as to reduce the bulk of the treatment machine.

In parallel, to optimize production, a maximum number of optical lenses should be immersed at the same time.

BRIEF SUMMARY

The present invention therefore aims to reduce the bulk of the vessels while having an optical lens loading capacity of the conveyor carriage that is at least equivalent to that of the state of the art without deteriorating the deposition qualities due to the immersion of the lenses in the treatment baths.

To that end, the present invention relates to a lens-holding device intended to be hooked on a support of a conveyor carriage for transporting optical lenses in order for said lenses to be treated by immersion in at least one bath of the treatment machine, said lens-holding device being hooked in such a way as to form an alignment of devices together with a group of other similar devices in a predetermined direction, said lens-holding device including suspension elements suspension elements for hanging from the support, first holding part for holding a first optical lens in position on the lens-holding device, comprising supporting points defining a first location for the first lens, second holding part for holding a second optical lens in position on the lens-holding device, comprising supporting points defining a second location for the second lens, the two locations respectively being arranged in two planes separated by an angular distance of less than 30° and forming an angle of less than 30° relative to the direction defined by the alignment of the group of lens-holding devices.

This arrangement makes it possible to reduce the width of the vessels on either side of the support while preserving the treatment qualities of the lenses.

According to one embodiment, the two locations respectively arranged in two planes have an angular separation of less than 20° and an angular separation relative to the direction determined by the alignment of the group of lens-holding devices smaller than 10°.

This arrangement makes it possible to position, substantially parallel, one location relative to the other on the one hand, and the two locations relative to the direction determined by the alignment of the group of lens-holding devices on the other hand.

According to one embodiment, the lens-holding device includes a body positioned outside the volume defined between the two locations.

This arrangement makes it possible to perform optical measurements on the lens without being bothered by the body of the lens-holding device.

According to one embodiment, the lens-holding device includes a body extending at least partially in a volume defined between the two locations.

This arrangement facilitates the production of the lens-holding device.

According to one embodiment, the holding parts for holding in position each include support portions providing a first supporting point for the lens, elastic return elements providing a second and third supporting point for the lens.

According to one embodiment, the elastic return elements include pairs of elastic arms.

According to one embodiment, the pairs of elastic arms are retained on the body of the lens-holding device.

According to one embodiment, the locations are positioned on either side of the body, in the direction transverse to the direction of the alignment.

This arrangement makes it possible to optimize the bulk of the optical lenses.

According to one embodiment, the two pairs of arms are symmetrical relative to the body.

This arrangement makes it possible to facilitate the production of the lens-holding device, which thus only requires one same type of pair of arms.

According to one embodiment, each pair of arms is made in a single piece.

This arrangement makes it possible to have a piece with a predetermined pre-stress.

According to one embodiment, the support portions are fixed on the body.

According to one embodiment, the support portions for the optical lens comprise two stops positioned symmetrically on either side of the body.

According to one embodiment, the two stops are formed in a single piece.

This arrangement facilitates the production of the lens-holding device.

According to one embodiment, the two stops are positioned at the lower end of the body.

This arrangement optimizes the size of the body.

According to one embodiment, the suspension elements for hanging from the support include a catch making it possible to removably secure the lens-holding device on its support and have locking elements locking elements preventing the free rotation of the lens-holding device around its support.

This arrangement makes it possible to eliminate the lateral oscillation movements that may be created during a change in direction of the conveyor carriage.

According to one embodiment, the suspension elements of the body of the lens-holding device are formed in a single piece.

This arrangement makes it possible to facilitate the production of the lens-holding device by decreasing the number of parts necessary for the production thereof.

According to one embodiment, the locking elements include a portion with a shape complementary to a portion for hooking on the support.

This arrangement makes it possible to resolve the problem of the lateral oscillation of the lens-holding devices around the support. According to one embodiment, all of the contours designed to be immersed define only open surfaces.

This arrangement makes it possible to prevent the formation of a film of liquid from the bath in which the optical lens is immersed from being formed, that film being able to burst and thus form projections that can reach the optical lens and make the deposition deposited on the surfaces thereof non-homogenous.

The present invention also relates to a conveyor carriage designed to transport optical lenses so as to treat them by immersion in at least one bath of the treatment machine, in which the conveyor carriage includes a lens-holding device as previously described.

The present invention also relates to an optical lens treatment device including such a conveyor carriage.

BRIEF DESCRIPTION OF THE DRAWINGS

In any case, the invention will be well understood using the following description, in reference to the appended diagrammatic drawing showing, as a non-limiting example, a lens-holding device according to the invention.

FIG. 1 shows a general perspective view of one embodiment of the lens-holding device according to the invention.

FIG. 2 shows a detailed view of the first part of the device of FIG. 1.

FIG. 3 shows a detailed view of the second part of the device of FIG. 1.

FIG. 4 shows a detailed view of the third part of the device of FIG. 1.

DETAILED DESCRIPTION

Figure 5:
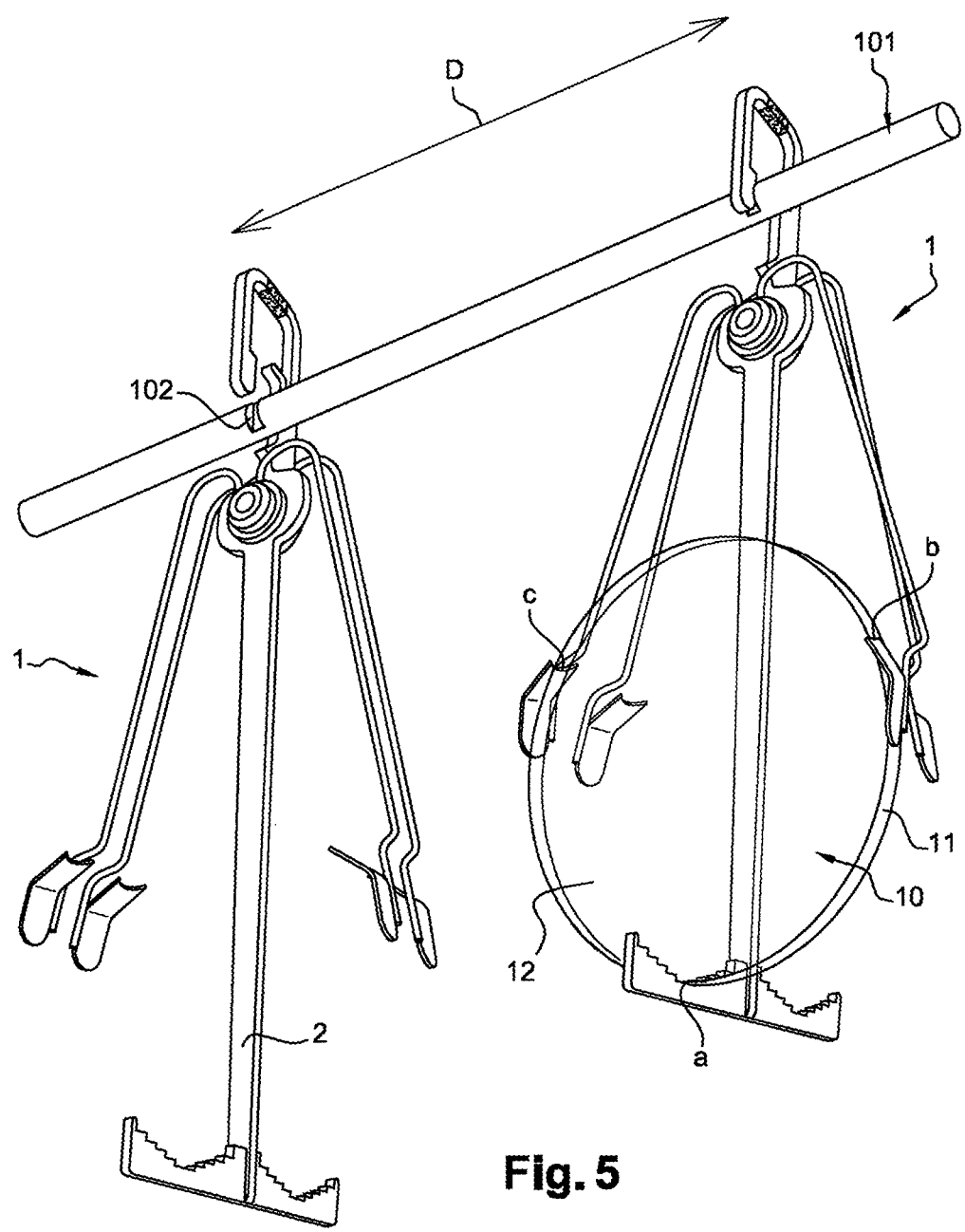
FIG. 5 shows the lens-holding device of FIG. 1 situated with two optical lenses on a support of the conveyor carriage.

As illustrated in FIG. 1, a lens-holding device 1 according to one embodiment of the invention includes a longilineal central body 2, also called a shaft, to which suspension elements 3 of the lens-holding device 1 are connected, in particular a support 101 embodied by a rectilinear chassis bar 101 of the conveyor carriage, and holding parts 4 for holding the optical lens 10 in position.

Figure 6:
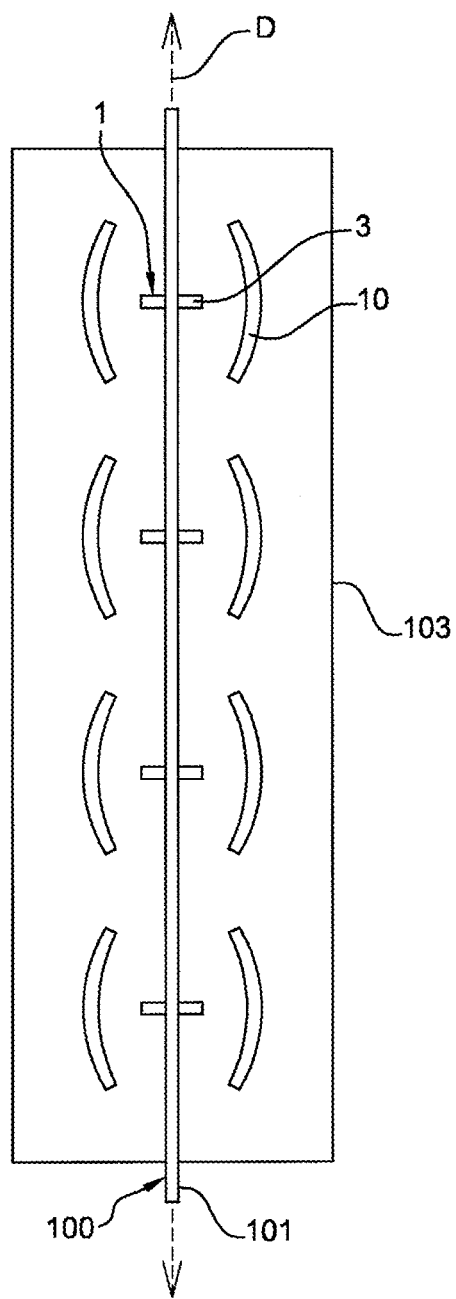
FIG. 6 illustrates the alignment of the lens-holding devices of FIG. 1 situated above a vessel.

The lens-holding device 1 is thus hooked on the chassis bar 101 of the conveyor carriage with a group of other similar devices 1 so as to form an alignment of lens-holding devices 1 in a determined direction D more particularly illustrated in FIG. 6.

In one embodiment illustrated in FIGS. 1 to 5, each of the lens-holding devices 1 comprises first holding part 4a for holding a first optical lens 10 in position on the lens-holding device 1, positioned on a first side of the body 2 of the lens-holding device 1 and defining a first location for the first lens 10 on the one hand, and second holding part 4b for holding a second optical lens 10 in position on the lens-holding device 1, positioned on the second side of the body 2 of the lens-holding device 1 and defining a second location for the second lens 10 on the other hand.

The two locations, defined by supporting points a, b, c, are defined such that each position of an optical lens 10 is respectively arranged in a different plane, the two planes being on the one hand substantially parallel to each other with a separation smaller than 30° and on the other hand substantially parallel to the direction D determined by the alignment of the group of lens-holding devices 1 with a separation smaller than 30°.

In this embodiment, the body 2 of the lens-holding device 1 extends partially in a volume defined between the two locations.

An optical lens comprises two main faces 12 or optics and a peripheral edge 11.

The volume defined between the two locations must be interpreted as being an area of the space situated between the two optical lenses 10, when they are positioned in their respective locations, and defined by the set of straight lines passing through the main faces 12 or optics of the two optical lenses 10.

The suspension elements 3 of a lens-holding device 1 are connected to a first end of the body 2 and form a catch in 31 the shape of an upside down U including two branches 31a, 31b and an opening 32.

The opening 32 created between the branches 31a, 31b of the catch 31 is designed to receive the chassis bar 101 of a conveyor carriage that is gripped between part of the branches 31a, 31b, one of which 31a has a rectilinear profile that is engaged in a notch 102 whereof the bottom is also rectilinear, the blocking by shape matching done by the contact between the two rectilinear faces of the branch 31a and the bottom of the notch 102, respectively, resulting in preventing the body 2 from rotating freely around the bar 101 and falling, in particular upon movement of the conveyor carriage during a treatment chain.

Furthermore, the branch 31a has a stop 33 making it possible to limit the insertion of the lens-holding device 1 on the chassis bar 101 so as to make the two rectilinear faces of the branch 31a and the bottom of the notch 102 match.

These suspension elements 3 are made in a single piece with the body 2 but separated therefrom by a torsion area 36 placing the suspension elements 3 generally in a plane with the same orientation as the notch 102, and more particularly in the embodiment shown in a plane oriented substantially longitudinally with respect to a general plane of the body 2.

The suspension elements 3 also comprise gripping parts 34 in the shape of an upside down U, and defined by the stop 33, making it possible to grip the lens-holding device 1 so as to suspend it on or remove it from the chassis bar 101.

Lastly, the suspension elements 3 include marking elements 35, such as a ring, to quickly identify one particular lens-holding device 1.

The lens-holding device 1 can thus be assembled or disassembled easily from the chassis bar 101 by simple snapping of the catch 31 in the notch 102, and it is then possible to perform verifications of the optical lens 10 without touching it directly with the fingers by removing the corresponding lens-holding device 1 from the chassis bar 101.

The holding parts 4a, 4b for holding in position respectively comprise support portions 5a, 5b defining a first supporting point a for the lens 10, and elastic return elements 6a, 6b, respectively, defining a second b and third c supporting point for the lens 10. The support portions 5a, 5b are stationary relative to the body 2 and are positioned on the second end of the body 2 across from the first end of the body 2 on which the suspension elements 3 are positioned.

The support portions 5a, 5b of each holding parts 4a, 4a respectively include a stop 51a, 51b made in a single piece with the other stop 51a, 51b.

Each of these stops 51a, 51b extends generally in a direction transverse to the alignment direction D of the group of lens-holding devices 1 hooked on the chassis bar 101, which, in the illustrated embodiment, coincides with a direction arranged in the same plane as that in which the upside down U shape of the catch 31 of the suspension elements 3 extends.

The fastening of the support portions 5a, 5b to the body 2 is done by forming an assembly of the tenon-mortise type through the adjusted insertion of the support portions 5a, 5b acting as the tenon, in a longitudinal slit with respect to the direction of the body 2 machined at the end of the body 2 performing the mortise function.

The immobilization of the support portions 5a, 5b on the end of the body 2 is then done by clinching, causing a plastic deformation of the end of the body 2 on the support portions 5a, 5b.

Each of the two stops 51a, 51b has a cup-shaped upper contour with terraced lateral edges making it possible to wedge optical lenses 10 with different thicknesses.

The elastic return elements 6a, 6b are formed by two thin metal rods 61a, 61b folded at the middle thereof so as each to form two arms 61a', 61a" and 61b', 61b", respectively.

Each of the rods 61a, 61b is positioned on either side of the body 2 of the lens-holding device 1 and extends substantially in a plane parallel to the alignment direction D of the group of lens-holding devices 1 on the chassis bar 101, and more specifically in the illustrated embodiment, in a plane transverse to a plane in which the suspension elements 3 are arranged.

Each of the rods 61a, 61b is embedded around an axis embodied by a rivet 63 secured to the body 2 at the fold thereof on a wider portion 64 of the body 2 located in the immediate vicinity of the torsion area 36 of the body 2 delimiting the body 2 of the suspension elements 3.

The two arms 61a', 61a" or 61b', 61b" respectively formed by each of the rods 61a, 61b are elastically returned toward one another, which makes it possible to grip the optical lens 10 between two free ends 65a', 65a" or 65b', 65b" of the same rod 61a, 61b by means of a contact piece 66 welded on each of said free ends 65a', 65a" or 65b', 65b".

In order to return the two locations of the optical lenses 10 to a plane substantially parallel to the direction D formed by the alignment of the set of devices 1 on the chassis bar 101 and substantially passing through the center of each stop 51a, 51b, the rods 61a, 61b are slightly bent in the form of a baffle in the vicinity of each of their free ends 65a', 65a" or 65b', 65b", and each contact piece 66 is welded on the lateral edge of the end 65a', 65a" or 65b', 65b" of the rods 61a, 61b opposite the other rod 61a, 61b.

The contact piece 66 is a metal piece in the form of a curved blade having, at its end designed to be in contact with the optical lens 10, a curved cutout 67 making it possible to hold optical lenses 10 with variable thicknesses.

The curved cutouts 67 each show two tips 68 making it possible to hold a very thick optical lens 10 by positioning the peripheral edge 11 of the optical lens 10 in contact with the tips 68, which results, in particular after applying varnish or another liquid, in not altering the latter due to a reduced contact surface.

The thin optical lenses 10 are maintained by positioning the peripheral edge 11 between the two tips 68 of each cutout 67.

The lens-holding device 1 thus obtained makes it possible to form a group with similar lens-holding devices 1 with a reduced bulk making it possible to reduce the dimensions of the vessels 103 for the various baths and increase the number of optical lenses 10 treated simultaneously by soaking in a bath.

Although the invention has been described with respect to specific example embodiments, it is of course in no way limited thereto, and on the contrary encompasses all technical equivalents of the described parts, elements or portions as well as any combinations thereof.

The aforementioned angular separations are thus to be understood in absolute value.

The invention claimed is:

1. A lens-holding device intended to be hooked on a support of a conveyor carriage for transporting optical lenses in order for said lenses to be treated by immersion in at least one bath of the treatment machine, said lens-holding device being hooked in such a way as to form an alignment of devices together with a group of other similar devices in a predetermined direction, said lens-holding device including:
   suspension elements for hanging from the support,
   first holding part for holding a first optical lens in position on the lens-holding device, comprising supporting points defining a first location for the first lens,
   second holding part for holding a second optical lens in position on the lens-holding device, comprising supporting points defining a second location for the second lens,
   the two locations respectively being arranged in two planes separated by an angular distance of less than 30° and forming an angle of less than 30° relative to the direction defined by the alignment of the group of lens-holding devices, the locations being positioned on either side of the body, in the direction transverse to the direction of the alignment,
   the suspension elements for hanging from the support include a catch making it possible to removably secure the lens-holding device on its support and have locking elements preventing the free rotation of the lens-holding device around its support.

2. The lens-holding device according to claim 1, wherein the two locations respectively arranged in two planes have an angular separation of less than 20° and an angular separation relative to the direction determined by the alignment of the group of lens-holding devices smaller than 10°.

3. The lens-holding device according to claim 1, including a body positioned outside the volume defined between the two locations.

4. The lens-holding device according to claim 1, including a body extending at least partially in a volume defined between the two locations.

5. The lens-holding device according to claim 1, wherein the holding parts each including:
   support portions providing a first supporting point for the lens, elastic return elements providing a second and third supporting point for the lens.

6. The lens-holding device according to claim 5, wherein the elastic return elements include independent pairs of elastic arms for each position location of a lens.

7. The lens-holding device according to claim 5, wherein the support portions for the optical lens comprise two stops positioned symmetrically on either side of the body.

8. The lens-holding device according to claim 1, wherein all of the contours designed to be immersed define only open surfaces.

9. A conveyor carriage designed to transport optical lenses so as to treat them by immersion in at least one bath of the treatment machine, in which the conveyor carriage includes a lens-holding device according to claim 1.

10. An optical lens treatment device including a conveyor carriage according to claim 9.

* * * * *